Nov. 15, 1927. 1,649,159
D. F. FESLER
LUBRICANT COMPRESSOR
Filed June 6, 1921
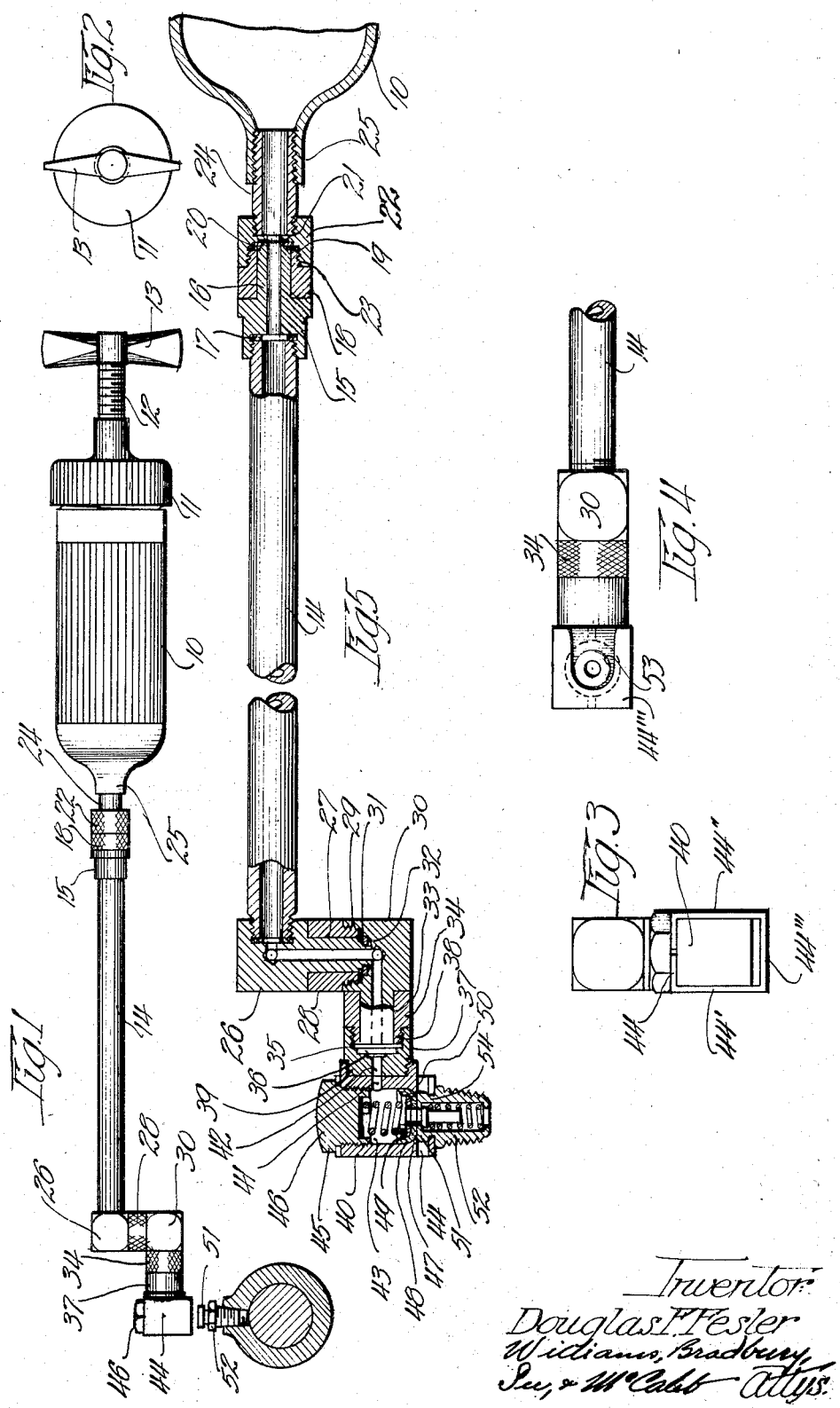
Inventor:
Douglas F. Fesler
Williams, Bradbury,
Sue, & McCabe  Attys.

Patented Nov. 15, 1927.

1,649,159

UNITED STATES PATENT OFFICE.

DOUGLAS F. FESLER, OF EVANSTON, ILLINOIS, ASSIGNOR TO THE BASSICK MANUFACTURING CO., OF CHICAGO, ILLINOIS, A CORPORATION OF DELAWARE.

LUBRICANT COMPRESSOR.

Application filed June 6, 1921. Serial No. 475,189.

My invention relates to improvements in lubricant compressors and is particularly concerned with the provision of a novel type of compressor to be used in those lubricating systems which comprise a plurality of fittings to be secured to the bearings to be lubricated and a compressor having a discharge conduit, the free end of which is provided with a coupling adapted to be successively attached to and detached from the fittings, the coupling comprising means for making sealed connections with the fittings.

The objects of my invention are:

First; to provide a compressor of the character described, the discharge conduit of which is formed of rigid pipe.

Second; to provide a compressor, the discharge conduit of which is formed of a plurality of sections which are so connected as to permit the coupling at the free end of the discharge conduit to be positioned in practically any desired position so as to facilitate the connection of the coupling with fittings in more or less inaccessible positions.

Third; to provide a compressor comprising a discharge conduit, the free end of which is provided with a coupling, the discharge conduit being rigid and the coupling being of such character as to permit it to be attached to a fitting without being directly manipulated.

Fourth; to provide a compressor of the character described in which the portions of the discharge conduit are connected by joints which are adapted to withstand high pressures without leaking, but which can be economically manufactured.

Other objects will appear as this description progresses, reference being had to the accompanying drawings, in which Figure 1 is a view showing my improved compressor in side elevation in connection with a bearing which is shown in cross section, the bearing being provided with a fitting adapted to co-act with the coupling of my compressor;

Figure 2 is an end elevation;

Figure 3 is an end elevation looking toward the end of the discharge conduit;

Figure 4 is a bottom view of a portion of the discharge conduit and the coupling; and Figure 5 is a side elevation partially in central longitudinal section, showing certain details of construction of the discharge conduit and coupling of my compressor.

Referring to the drawings, my improved compressor comprises a barrel 10 which may be of any desired type, but which is here shown as having a detachable cap 11 in which is threaded the rod 12, the inner end of which is provided with a suitable plunger or piston (not shown) and the outer end of which is provided with a handle 13 by means of which the rod 12 can be rotated to reciprocate the plunger in the barrel 10.

The inner end of the discharge conduit 14, which is formed of rigid pipe of any suitable material, is threaded into one end of the nipple 15, the opposite end of the nipple being provided with a tubular extension 16 of reduced diameter. A gasket 17 is inserted between the inner end of the conduit 14 and the nipple 15 to provide a fluid tight connection. A sleeve 18 is rotatably mounted upon the tubular extension 16 and held in position by means of a gasket 19 and washer 20 which are threaded onto the end of the tubular extension 16 and held in place by swaging the end of the tubular extension over, as shown at 21. A coupling 22 is threaded into the screw threaded extension 23 of the sleeve 18 and its opposite end is connected with a short section 24 of pipe, the inner end of which is threaded into the discharge outlet 25 of the compressor barrel.

By means of the construction described above the discharge conduit 14 is swiveled to the barrel 10 of the compressor so that it can rotate about its own axis.

The outer or free end of the discharge conduit is threaded into one end of an elbow 26. The opposite end of the elbow 26 is in the form of a tubular extension 27 upon which is rotatably mounted a sleeve 28 having a threaded extension 29 which screws into the end of a second elbow 30. A gasket 31 and a washer 32, secured to the outer end of the tubular extension 27, hold the sleeve 28 in position in the same manner in which the sleeve 23 is held by the gasket 19 and ring 20.

The other end of the elbow 30 is in the form of a tubular extension 33 upon which is rotatably mounted a sleeve 34 that is held in position by means of a gasket 35 and washer 36. It will be seen from an inspection of Figure 5 that the two elbows 26 and 30 are identical in construction, and that each comprises a female portion opening in one direction and a male portion extending at right angles thereto for connection with the next element in the series.

A coupling 37 is threaded upon the screw thread extension 38 of the sleeve 34 and its outer end 39 is threaded into one side of the body member 40 of the coupling which I have illustrated as forming a part of my invention. This side of the body member 40 is provided with an opening 41 which registers with the bore 42 in the end of the coupling 37 to establish communication between the discharge conduit and the bore 43 which extends through the body member 40.

The body member 40 is surrounded by a strap 44, the ends of which are secured beneath the flange 45 of the plug 46 which is threaded into one end of the bore 43, as shown in Figure 5. The opposite end of the bore 43 is provided with an inwardly extending flange 47 which forms a seat for a cup leather 48. A compression spring inserted between the plug 46 and a washer 49 at the bottom of the cup leather 48 tends to hold the cup leather with its outer side projecting slightly beyond the adjacent side 50 of the body member. The sides 44' and 44" of the strap 44 are longer than the adjacent sides of the body member 40, so that the side 44''' is held in spaced relation to the adjacent side of the body member to provide a space for receiving the head 51 of the fitting or coupling 52 which is secured to a bearing to be lubricated. The side 44''' of the strap is provided with a notch 53 which extends inwardly from one side thereof for receiving the neck 54 of the fitting 52.

The details of construction of the coupling described above are illustrated and described in the copending application of Ernest W. Davis, Serial No. 444,932, filed February 14, 1921, and form no part of my present invention except as they co-act with the other details of construction of my present invention.

From the above description it will be seen that the rigid conduit 14 can be rotated upon its axis to position the elbow 26 in any desired position in its plane of rotation and that the elbow 30 can be rotated upon the tubular extension 27 of the elbow 26 to position its tubular extension 33 in any position in its plane of rotation and that, finally, the coupling can in a similar manner be rotated upon the tubular extension 33, so that it is possible to position the coupling in any one of an innumerable number of different positions and thus make it possible to properly position the coupling to be secured to fittings 52 whatever their position may be.

Whenever the coupling is so positioned that the connection with the fitting can be made by a movement in either direction parallel with the discharge conduit 14, the connection can be established without touching the coupling and by merely using the gun barrel 10 and discharge conduit 14 as a handle to properly position and manipulate the coupling. If the joints of the different swivel connections are made comparatively tight, then the coupling can be connected with the fittings without directly manipulating it, irrespective of the position of the coupling, because it requires practically no force to engage the coupling with the fitting. When the compressor is then actuated to exert pressure upon the lubricant, the cup leather 48 is held against the adjacent end of the fitting by the pressure of the lubricant and thus locks the coupling to the fitting until the pressure on the lubricant is released.

While I have described the details of construction of the preferred embodiment of my invention, it is to be clearly understood that my invention is not limited to these details, but is capable of other adaptations and modifications within the scope of the appended claims.

Having thus described my invention, what I claim is:—

1. A lubricant compressor, comprising a barrel, a rigid discharge conduit connected to said barrel by a swivel to rotate about the axis of said rigid conduit, an elbow secured to the free end of said rigid conduit, a second elbow swiveled upon the free end of said first named elbow, and a coupling swiveled upon the free end of said second elbow to rotate about an axis parallel to the axis of said rigid conduit, the said coupling comprising means for making connection with a second coupling by a rectilinear movement.

2. A lubricant compressor, comprising a barrel, a rigid discharge conduit connected to said barrel by a swivel to rotate about the axis of said rigid conduit, an elbow secured to the free end of said rigid conduit, a second elbow swiveled upon the free end of said first named elbow, and a coupling swiveled upon the free end of said second elbow to rotate about an axis parallel to the axis of said rigid conduit.

3. A lubricant compressor, comprising a barrel, a rigid discharge conduit connected to said barrel, an elbow secured to the free end of said rigid conduit, a second elbow swiveled upon the free end of said first named elbow, and a coupling swiveled upon the free end of said second elbow to rotate about an axis parallel to the axis of said rigid conduit.

4. A lubricant compressor comprising a barrel having a rigid discharge conduit connected thereto by a swiveled joint to rotate about its own axis, the free end of said conduit being provided with a right angle extension, a member swiveled upon said right angle extension and likewise having a right angle extension, and a coupling swiveled upon said last named right angle extension to rotate about the axis thereof.

5. A lubricant compressor, comprising a barrel having a rigid discharge conduit connected thereto, the free end of said conduit being provided with a right angle extension, a member swiveled upon said right angle extension and likewise having a right angle extension, and a coupling swiveled upon said last named right angle extension.

6. A lubricant compressor, comprising a barrel having a rigid discharge conduit connected thereto, the free end of said conduit being provided with a right angle extension, a member connected with said right angle extension and likewise having a right angle extension, and a coupling swiveled upon said last named right angle extension.

7. A lubricant compressor, comprising a barrel having a rigid discharge conduit connected thereto by a swiveled joint to rotate about its own axis, a coupling comprising means for making connection with another coupling by a rectilinear movement, and means for connecting said first named coupling with the free end of said conduit to rotate bodily about the axis of said conduit; to rotate about its own axis; and to rotate in a plane parallel with the axis of said conduit.

8. A compressor comprising a barrel having a discharge conduit member connected therewith by a swivel connection permitting said conduit member to be rotated about its own axis, a coupling for detachably connecting the free end of said conduit member with another coupling, and means for connecting said first named coupling to said conduit member comprising a pivotal connection permitting movement only about an axis extending transversely of said conduit member.

9. A compressor comprising a barrel having a discharge conduit member, a coupling for detachably connecting the free end of said conduit member with another coupling, and means for connecting said first named coupling to said conduit member comprising a pivotal connection permitting movement only about an axis extending transversely of said conduit member.

10. Pressure lubricating means comprising a gun, a relatively long rigid tube coaxial with the gun and swiveled about the gun axis, a lateral offset at the end of said tube, a section swiveled on said offset to swing in a plane parallel to said tube, and a coupling on the end of said section swiveled about the section axis.

11. Pressure lubricating means comprising a gun, a relatively long rigid tube swiveled on the gun for rotation about its own axis, a lateral offset at the end of said tube, a section swiveled on said offset to swing in a plane parallel to said tube, and a coupling on the end of said section swiveled about the section axis.

12. Pressure lubricating means comprising a gun, a relatively long rigid tube swiveled on the gun for rotation about its own axis, a lateral offset at the end of said tube, a section swiveled on said offset to swing in a plane parallel to said tube, and a coupling on the end of said section.

13. Pressure lubricating means comprising a gun, a relatively long rigid tube projecting away from the gun and a lateral offset at the end of said tube, a section swiveled on said offset to swing in a plane parallel to said tube, and a coupling on the end of said section.

In witness whereof, I hereunto subscribe my name this 24th day of May, 1921.

DOUGLAS F. FESLER.